US008306851B2

(12) United States Patent
Wells et al.

(10) Patent No.: US 8,306,851 B2
(45) Date of Patent: Nov. 6, 2012

(54) AUTOMATED PRICE MANAGEMENT SYSTEM

(75) Inventors: Paul Christopher Wells, El Dorado, AR (US); Brian Alan Bates, El Dorado, AR (US)

(73) Assignee: Murphy Oil USA, Inc., El Dorado, AR (US)

( * ) Notice: Subject to any disclaimer, the term of this patent is extended or adjusted under 35 U.S.C. 154(b) by 1585 days.

(21) Appl. No.: 10/375,647

(22) Filed: Feb. 27, 2003

(65) Prior Publication Data

US 2004/0172372 A1  Sep. 2, 2004

(51) Int. Cl.
*G06Q 10/00* (2012.01)
(52) U.S. Cl. ...................... 705/7.35; 705/400
(58) Field of Classification Search ............... 705/1, 16, 705/20, 28, 400, 413, 10, 7.35
See application file for complete search history.

(56) References Cited

U.S. PATENT DOCUMENTS

| 4,002,886 | A |   | 1/1977  | Sundelin |       |
|-----------|---|---|---------|----------|-------|
| 5,172,314 | A |   | 12/1992 | Poland et al. | |
| 5,257,020 | A |   | 10/1993 | Morse |       |
| 5,873,069 | A |   | 2/1999  | Reuhl et al. | |
| 5,883,968 | A |   | 3/1999  | Welch et al. | |
| 5,977,998 | A |   | 11/1999 | Briechle et al. | |
| 6,009,538 | A |   | 12/1999 | Goodwin, III et al. | |
| 6,076,071 | A | * | 6/2000  | Freeny, Jr. | 705/26 |
| 6,292,786 | B1 | * | 9/2001 | Deaton et al. | 705/14 |
| 6,298,474 | B1 |   | 10/2001 | Blowers et al. | |
| 6,308,162 | B1 | * | 10/2001 | Ouimet et al. | 705/7 |
| 6,341,268 | B2 |   | 1/2002  | Walker et al. | |
| 6,513,016 | B1 |   | 1/2003  | Freeny, Jr. | |
| 6,703,934 | B1 |   | 3/2004  | Nijman et al. | |
| 6,772,209 | B1 |   | 8/2004  | Chernock et al. | |
| 6,803,926 | B1 |   | 10/2004 | Lamb et al. | |
| 6,823,320 | B1 |   | 11/2004 | Rubin | |
| 6,845,363 | B1 |   | 1/2005  | Matsubara et al. | |
| 6,851,604 | B2 |   | 2/2005  | Girotto et al. | |
| 6,873,968 | B2 |   | 3/2005  | Ehrlich et al. | |

(Continued)

FOREIGN PATENT DOCUMENTS

JP  2002163437 A  6/2002

(Continued)

OTHER PUBLICATIONS

Rao, et al., Equilibrium Price Communication and Unadvertised Specials by Competing Supermarkets, Marketing Science, vol. 20, No. 1, Winter 2001, pp. 61-81.*

(Continued)

*Primary Examiner* — Daniel Vetter
(74) *Attorney, Agent, or Firm* — Alston & Bird LLP

(57) ABSTRACT

A price management system that is capable of automatically or manually determining price adjustments based on current competitor pricing, retail site sales and other price related factors, such as cost of the product, freight charges, state and federal laws and state and federal taxes. Once price adjustments are determined they are able to be instantaneously and automatically implemented at the point of sale. In one of the most relevant applications, retail automotive fuel pricing, the system is able to automatically adjust and display prices on the fuel pumps as well as the advertising signs in the vicinity of the retail site. This system and methods provide for a comprehensive and efficient means of determining price adjustments and implementing the price adjustments in real-time fashion at the point-of-sale.

26 Claims, 11 Drawing Sheets

U.S. PATENT DOCUMENTS

| | | | |
|---|---|---|---|
| 6,886,745 B2 | 5/2005 | Berrube et al. | |
| 6,965,872 B1 * | 11/2005 | Grdina | 705/26 |
| 6,983,278 B1 * | 1/2006 | Yu et al. | 707/9 |
| 6,993,498 B1 | 1/2006 | Deaton et al. | |
| 7,013,006 B1 | 3/2006 | Tischer | |
| 7,302,410 B1 * | 11/2007 | Venkatraman et al. | 705/35 |
| 7,386,519 B1 * | 6/2008 | Delurgio et al. | 705/400 |
| 7,523,047 B1 * | 4/2009 | Neal et al. | 705/7.35 |
| 7,970,713 B1 * | 6/2011 | Gorelik et al. | 705/400 |
| 2001/0039512 A1 * | 11/2001 | Nicholson | 705/14 |
| 2002/0116348 A1 * | 8/2002 | Phillips et al. | 705/400 |
| 2002/0198948 A1 | 12/2002 | Lin | |
| 2003/0023567 A1 * | 1/2003 | Berkovitz et al. | 705/400 |
| 2003/0110066 A1 * | 6/2003 | Walser et al. | 705/7 |
| 2004/0225516 A1 | 11/2004 | Bruskotter et al. | |
| 2004/0249643 A1 | 12/2004 | Ouyang et al. | |
| 2005/0160014 A1 | 7/2005 | Moss et al. | |
| 2006/0227085 A1 | 10/2006 | Bolt, Jr. et al. | |

FOREIGN PATENT DOCUMENTS

| | | |
|---|---|---|
| JP | 2003242381 A | 8/2003 |
| JP | 2003337982 A | 11/2003 |
| WO | WO 01/29746 A2 | 4/2001 |

OTHER PUBLICATIONS

Uddi.org (Universal Description, Discovery and Integration); Technical White Paper; Sep. 6, 2000; 13 pages.

* cited by examiner

Store #: 5674  City: Bossier City  State: LA  Open Date: 08/27/1999  Last Called: 5:52:16 AM  08/14/2002  Phone: (318) 549-1985  Group: Gray  ☑ Competitor Report Site Information — 326
Competition Follows: Sometimes
Store Competitors — 328
Go To Price:
Reporting — 330
Print Report
Daily Pricing — 332
Lowest Legal Price: $1,243

| Date | Gallons | Giftcard | UL | Plus | Prem | Diesel | Pool Margin |
|---|---|---|---|---|---|---|---|
| 08/08/02 | 10,552 | 2,889 | $1.279 | $1.399 | $1.479 | $0.000 | 0.1100 |
| 08/09/02 | 10,150 | 3,204 | $1.279 | $1.399 | $1.479 | $0.000 | 0.1139 |
| 08/10/02 | 12,199 | 3,644 | $1.279 | $1.399 | $1.479 | $0.000 | 0.1186 |
| 08/11/02 | 11,056 | 3,347 | $1.259 | $1.379 | $1.459 | $0.000 | 0.0986 |
| 08/12/02 | 10,057 | 2,999 | $1.259 | $1.379 | $1.459 | $0.000 | 0.0986 |
| 08/13/02 | 11,284 | 3,440 | $1.259 | $1.379 | $1.459 | $0.000 | 0.0825 |
| 08/14/02 | 11,268 | 3,526 | $1.259 | $1.379 | $1.459 | $0.000 | 0.0877 |

Projected Fuel Cells: 340,134
% of Plan: +0.93%
Prior Year: 296,978
Non-Fuel Sales: $1,758

| Comp # | Tier | Station | Unleaded | Plus | Premium | Diesel |
|---|---|---|---|---|---|---|
| 1 | 2 | Diamond Shamrock | $1.27 | $1.37 | $1.47 | $0.00 |
| 2 | 2 | Circle K | $1.29 | $1.39 | $1.49 | $0.00 |
| 3 | 2 | Food Fast | $1.29 | $1.36 | $1.46 | $0.00 |
| 4 | 0 | Shell | $1.31 | $1.41 | $1.51 | $0.00 |
| 5 | 0 | Exxon | $1.29 | $1.39 | $1.49 | $0.00 |
| 6 | 2 | Citgo | $1.31 | $1.41 | $1.51 | $0.00 |
| 7 | 1 | Albertsons Express | $1.28 | $1.38 | $1.48 | $0.00 |
| 8 | 1 | Racetrac | $1.25 | $1.35 | $1.45 | $0.00 |

Four Week | Fuel Sales in Thousands of Gallons — This Week — Last Week

Note: 8 MPD site. Albertson's Card $.05 discount.

| Store# | City | State | District | Opened | Regular | Plus | Premium | Gift Card | Status | Version | Store Time | Price Date | Price Time |
|---|---|---|---|---|---|---|---|---|---|---|---|---|---|
| ⊙ 5530 | Natchez | MS | 436 | 09/12/1998 | 1.299 | 1.419 | 1.499 | 0.03 | *ERROR* | 2.4.4 | 8/14 3:07 PM | 07/29/02 | 10:59 am |
| ⊙ 5531 | Brookhaven | MS | 436 | 04/07/1998 | 1.259 | 1.379 | 1.459 | 0.03 | *ERROR* | 2.4.4 | 8/14 3:06 PM | 07/14/02 | 07:45 pm |
| ⊙ 5532 | Crowley | LA | 334 | 05/06/1998 | 1.199 | 1.319 | 1.399 | 0.03 | Connected | 2.4.4 | 8/14 3:08 PM | 08/13/02 | 10:52 am |
| ⊙ 5534 | Pelham | AL | 431 | 08/05/1998 | 1.229 | 1.349 | 1.429 | 0 | Connected | 2.4.4 | 8/14 3:07 PM | 08/02/02 | 10:07 am |
| ⊙ 5593 | Northport | AL | 435 | 07/23/1998 | 1.239 | 1.359 | 1.439 | 0 | Connected | 2.4.4 | 8/14 3:07 PM | 07/18/02 | 09:38 am |
| ⊙ 5594 | Crossville | TN | 141 | 08/06/1998 | 1.219 | 1.339 | 1.419 | 0.03 | *ERROR* | 2.4.4 | 8/14 3:07 PM | 08/06/02 | 07:26 am |
| ⊙ 5595 | Plant City | FL | 535 | 09/24/1998 | 1.319 | 1.439 | 1.519 | 0 | Connected | 2.4.4 | 8/14 4:06 PM | 08/08/02 | 08:26 am |
| ⊙ 5596 | Clarksville | TN | 132 | 10/23/1998 | 1.259 | 1.379 | 1.459 | 0.03 | Connected | 2.4.4 | 8/14 3:07 PM | 08/01/02 | 09:24 am |
| ⊙ 5597 | Sulphur | LA | 334 | 10/27/1998 | 1.219 | 1.339 | 1.419 | 0.03 | Connected | 2.4.4 | 8/14 3:07 PM | 08/09/02 | 08:43 am |
| ⊙ 5619 | Jesup | GA | 533 | 11/09/1998 | 1.159 | 1.279 | 1.359 | 0.03 | Connected | 2.4.4 | 8/14 4:07 PM | 08/09/02 | 09:18 am |
| ⊙ 5621 | Morgan City | LA | 337 | 11/15/1998 | 1.269 | 1.389 | 1.469 | 0.03 | *ERROR* | 2.4.4 | 8/14 3:06 PM | 07/30/02 | 07:14 am |
| ⊙ 5622 | Lafayette | LA | 334 | 11/06/1998 | 1.229 | 1.349 | 1.429 | 0.03 | *ERROR* | 2.4.4 | 8/14 3:06 PM | 07/16/02 | 09:49 am |
| ⊙ 5624 | Anniston | AL | 435 | 02/25/1999 | 1.249 | 1.369 | 1.449 | 0 | Connected | 2.4.4 | 8/14 3:06 PM | 08/02/02 | 10:08 am |

[1] Store Selected  449 Stores Connected                                    3:09 PM    08/14/2002

● Go To Price                    ○ Price Change                    ○ Effective Date & Time
Regular [1.269] ▲▼               Regular [0.00] ▲▼                [08/14/2002] ▽  [03:09 PM] ▲▼
Plus    [1.389] ▲▼               Plus    [0.00] ▲▼
Regular [1.469] ▲▼               Regular [0.00] ▲▼                    Send Price Change
        Gift Card                        Change All
        [0.03] ▲▼                       [0.00] ▲▼                    Today's Price Change

FIGURE 10

AUTOMATED PRICE MANAGEMENT SYSTEM

FIELD OF THE INVENTION

The present invention relates generally to retail price management and, more particularly, a retail price management system that takes into account current competitor pricing and current sales, automatically determines whether a price adjustment is necessary and automatically adjusts the prices at the point-of-sale. The invention is especially relevant to managing the price of products that frequently fluctuate in price, such as the sale of automotive fuel at retail service stations.

BACKGROUND OF THE INVENTION

For certain retail products, such as automotive fuel, pricing adjustments occur on a frequent basis. It is not uncommon to see fuels prices vary on a weekly and, sometimes, daily basis. These pricing adjustments are dictated by many factors; foremost are fuel costs and competitive pricing in the retail market.

In the retail fuel market in order to assess whether a price adjustment is warranted the retail site must determine what the current fuel price is at competitor sites. Traditionally, this has meant that the retail site must survey their predetermined competitors for current pricing information and report such data to price administrator who determines whether a price adjustment is warranted. A retail site representative will conduct a survey by visiting the competitors in the area and noting the current fuel prices. Surveys are typically conducted on a daily basis and the information is then transmitted to the price administrator, typically by an electronic means, such as electronic mail (email), facsimile (fax) or the like. More recently, Internet or corporate network based price survey mechanisms have been implemented to convey current competitor pricing information from the retail site to the price administrator.

The price administrator is typically located at a central or corporate headquarters office and is responsible for determining pricing of all or a percentage of the retail sites operated within the corporation's chain of sites. Once the price administrator receives the price survey information a manual determination is made whether to adjust prices based upon the price survey, fuel costs and other factors effecting fuel pricing. If a pricing change is warranted the price administrator typically conveys the price change, telephonically or by other electronic means, to the district manager responsible for the retail site who then, in turn, conveys the price change information to the retail site. The current system and method relies on the manual determination of the price administrator to determine if price adjustments are warranted. These manual determinations are susceptible to human error and reliance upon preconceived notions of which of the competitor pricings are most significant. In addition, the manual determination of pricing adjustments is an inefficient process that relies on daily manipulation by the price administrators of pricing information for each retail site to determine if price adjustment is warranted.

Once the retail site has been notified that a price change has been authorized, price changes are implemented by manually changing the prices at the fuel pumps and on the fuel advertising signs in the vicinity of the retail sites. Typically, price changes are implemented at the beginning of the business day or at another set time of day. Manually changing the prices at the fuel pumps and associated advertising signs is an inefficient means of implementing price changes for a commodity, such as retail fuel, that changes price on a frequent basis.

A need exists to develop a price management system that is instrumental in pricing products, such as retail fuel, that are susceptible to frequent price fluctuation. The system should be capable of automated price adjustment analysis that relies on statistical data to determine whether a price adjustment is required. Such an automated process will provide for efficient, real-time determination of price adjustments that do not rely on human bias or are susceptible to human error. In addition, the desired pricing system should provide for an automated means of changing prices at the point-of sale. In the retail fuel sale context, this would mean automatically changing the prices at the fuel pumps and at the associated advertising signs. Such automated pricing changing, should be capable of being implemented at the central pricing office or at the retail site. As such, pricing changes would be implemented immediately upon a determination that a price change is required and the central pricing office would be immediately notified that the pricing changes has effectively occurred.

The need exists to develop a price management system that will take into account various sales factors, determine whether a price adjustment is required for specific retail sites and automatically adjust the price at the point of sale (i.e. at the fuel pump and/or the retail site advertising signs). These sales factors include, but are not limited to, competitor pricing, volume of sales at retail sites, cost of the product being sold and state and federal laws. In order for such a system to be successfully implemented, the pricing adjustments must be determined and implemented efficiently due to the unstable nature of cost of the commodity and competitor pricing. Retail sites must be able to provide current competitor pricing information and current sales information to a centralized pricing unit, which uses this site-specific information along with other site-specific and generic pricing related information to determine whether a price adjustment is warranted. Upon determination that a price adjustment is necessary the centralized pricing unit must convey the information to the retail site and affect an automatic adjustment on the price at the point-of sale.

SUMMARY OF THE INVENTION

The present invention provides for an automated retail price management system and methods for managing retail price. The systems and methods for price management take into account current competitor pricing and current retail site sales information to automatically determine whether a price adjustment is necessary and, if so, automatically adjusts the price at the point-of-sale. The systems and methods are particularly relevant to managing the price of products that frequently fluctuate in price, such as the sale of automotive fuel at retail service station sites.

In one embodiment of the invention a system for price management includes a plurality of first network communication devices, such as desktop computers, each device associated with and typically located at a retail sales site. The network device implements a first price management module that receives inputs related to current competitor pricing and inputs or imports data related to current retail sales volume. The network device than electronically transmits this information to a centralized pricing office. Typically, the data is transmitted via satellite communication although other forms of electronic data transfer used in communication networks are also possible.

A second network communication device, such as a desktop computer in communication with memory devices and servers, receives the electronic communications from the plurality of first network communication devices. The second network communication device is associated with and typically located at a central pricing unit/office. The second network communication device implements a second price management module. The price management module is capable of assessing the competitor pricing information, the retail site sales information and other price related data to determine if a site-specific price adjustment is necessary. If a price adjustment is determined to be required, the price management module determines the adjustment value based upon the competitor pricing information, the retail site sales information and other price related data, such as cost of the product, freight cost from the source to the retail site, state and federal taxes, state and federal laws and the like. Once a price adjustment is determined the second network communication device electronically transmits the price adjustment information back to one or more of the plurality of first network devices. Upon receipt of the price adjustment information, the first price management module automatically changes the price at the point of sale and, in certain embodiments the price is changed on retail site related signs.

An additional feature of the price management system allows for the central pricing system administrator to manually input adjusted price information based upon competitor pricing, current retail site sales information and other pricing related information. In this manner, the system administrator can override the automated feature of the pricing management module or adjust pricing using price determining factors that are outside of those considered in the automated feature.

In one of the more relevant embodiments of the invention the price management system is employed in managing the pricing of retail automotive fuel at retail service stations. A plurality of first network communication devices, such as desktop computers, are typically located at retail fuel service station sites. The network device implements a first price management module that receives inputs related to current competitor fuel pricing and inputs or imports data related to current retail fuel sales. The network device than electronically transmits this information to a centralized pricing office.

A second network communication device, such as a desktop computer in communication with memory devices and servers, receives the electronic communications from the plurality of first network communication devices. The second network communication device is typically located at a central fuel pricing office, either regional, national or global. The second network communication device implements a second price management module. The second price management module is capable of assessing the competitor fuel pricing information, the retail site fuel sales information and other price related data to determine if a site-specific price adjustment is necessary. If a price adjustment is determined to be required, the price management module determines the adjustment value based upon the competitor fuel pricing information, the retail site fuel sales information and other price related data, such as cost of the fuel, freight cost from the source to the retail site, state and federal taxes, state and federal laws and the like. Once a price adjustment is determined the second network communication device electronically transmits the price adjustment information back to one or more of the plurality of first network devices. Upon receipt of the price adjustment information, the first price management module automatically changes the price at the fuel pumps and, in certain embodiments the price is changed on the retail site signage in the vicinity of the retail site.

In an alternate embodiment the invention is defined in terms of a method for price management. The method includes the steps of surveying the current prices being offered by predefined competitors in the general vicinity of a retail site. Once the survey is completed the results are inputted, along with current retail site sales information, into a networked device that implements a first price management module. The networked device electronically transmits this information to a second networked device that is associated with a central pricing function.

The second networked device implements a second price management module and, upon receipt of the information from the first networked device, determines whether a price adjustment is required based upon the current competitor pricing information and current retail sales information. If a determination is made that a price adjustment is required, the amount of the price adjustment is determined based upon current competitor prices, current retail site sales information and other price related information, such as cost of the product, freight costs, local/state/federal taxes and laws. Upon determination of the price adjustment amount, the price adjustment is transmitted electronically from the second network device to the first network device and the first price management module of the first network device implements the price adjustment by automatically affecting the price change at the point-of-sale.

Thus, the price management system of the present invention is able to automatically or manually determine price adjustments based on current competitor pricing, retail site sales and other price related factors, such as cost of the product, freight charges, state and federal laws and state and federal taxes. Once price adjustments are determined they are able to instantaneously and automatically be implemented at the point of sale. In one of the most relevant applications, retail automotive fuel pricing, the system is able to automatically adjust and display prices on the fuel pumps as well as the advertising signs in the vicinity of the retail site. This system and methods provide for a comprehensive and efficient means of determining price adjustments and implementing the price adjustments in real-time fashion at the point-of-sale.

BRIEF DESCRIPTION OF THE DRAWINGS

FIG. 3 is a depiction of a display monitor illustrating a site information file of a price management module, in accordance with an embodiment of the present invention.

FIG. 5 is a depiction of a display monitor illustrating a daily pricing filing of a price management module, in accordance with an embodiment of the present invention.

FIG. 10 is a depiction of an overall retail site database window of a price management module, in accordance with an embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
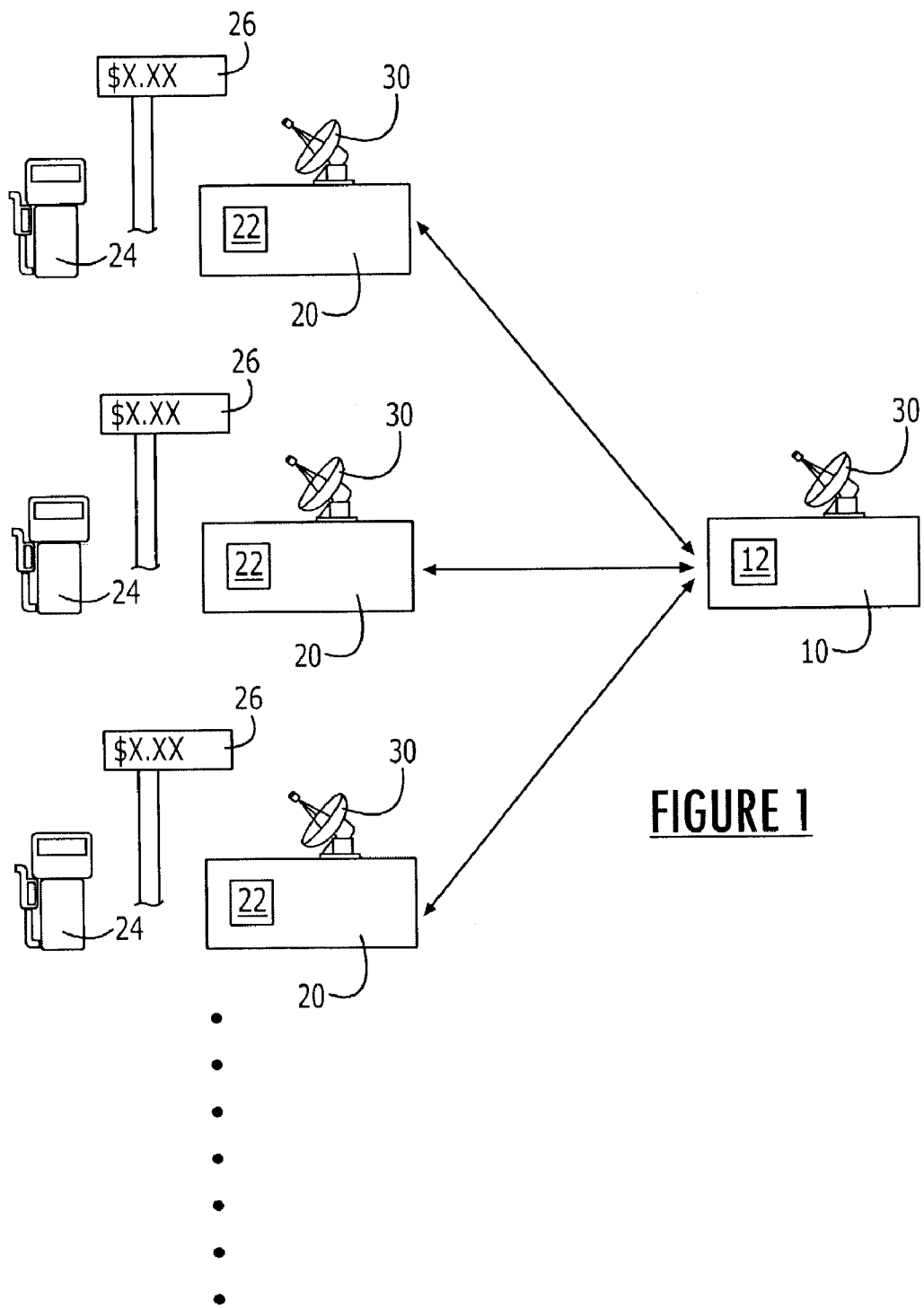
FIG. 1 is a block diagram of a price management system implemented in conjunction with retail automotive fuel pricing, in accordance with one embodiment of the present invention.

Referring to FIG. 1, shown is a block diagram of an automated pricing system, in accordance with an embodiment of the present invention. As illustrated, the pricing system is used in conjunction with fuel pricing and, specifically, fuel pricing at service stations. However, it is possible to implement the pricing system of the present invention in conjunction with the sale of other products, typically products in which the pricing structure is unstable and varies on a daily basis.

The pricing system of the present invention is implemented at a centralized pricing office 10 and one or more retail sites 20. A first pricing management module 22 is associated with the retail sites and a second pricing management module 12 is associated with the centralized pricing office. The pricing management modules are executed by appropriate processing means, typically in communication with a conventional desktop computer, server or the like. The pricing management modules of the present invention are adapted to be implemented via a communications network, such as the Internet, a corporate intranet or the like. The first and second pricing management modules function so as to automatically adjust the prices at the various remote retail sites 20 based on inputs from the remote retail sites. Price adjustments can be automated based upon predefined conditions that are established by the pricing management module or a pricing system administrator can manually adjust the prices for the one or more remote retail sites. Typically, conditions that will affect price will include cost of the product being sold, competitor pricing, state minimum pricing laws and the like.

As shown in FIG. 1, information is communicated from the centralized pricing office 10 to the remote retail sites 20 via satellite receivers/transmitters 30 located at the centralized pricing office and the remote retail sites. Satellite receivers/transmitters are shown by way of example only, other means of electronic information transfer, both wireless and wired, may also be implemented.

The centralized pricing office 10 communicates pricing information to the remote retail sites 20. The first pricing management module 22 is implemented by appropriate processing means at the remote retail site 20. In the embodiment depicted in FIG. 1, the first pricing management module is capable of receiving the pricing information from the central pricing office and executing automated price changes on the service station fuel pumps 24 and/or the fuel pricing signs 26 located within the general vicinity of the remote retail site. Once the pricing changes have been implemented, at the service station fuel pumps and/or the fuel pricing signs, a communication is sent by the first pricing management module at the remote retail site to the centralized pricing office to confirm that the pricing change is executed properly. In this regard, the centralized pricing office receives automated and real-time feedback that the price adjustment has been implemented.

The first pricing management module 22 will typically be configured such that pricing and sales information related to the remote retail site is inputted manually by a retail site system administrator or pricing and sales information is accessed from associated databases. For example, a retail site system administrator will survey competitor prices and manually input competitor prices into the first pricing management module. Sales data related to the retail site will be imported into the first pricing management module from associated sales databases or manually inputted into the first pricing management module by the retail site administrator. Once the competitor prices and sales data have been imported/inputted into the first pricing management system module, the information is communicated to the centralized pricing office 10. The second pricing management module 12 associated with the centralized pricing office receives the pricing and sales related information and uses such to calculate the necessary price adjustment for each individual remote retail site.

The second pricing management module determines if the competitor prices for specific retail site are within predefined threshold. If the determination is made that competitor prices are within the predefined thresholds, then the second pricing management module would implement predefined pricing rules, typically site-specific, to automatically execute a price change. Pricing rules are set by various sales factors including fuel cost, sales volume at the retail site, competitor pricing, etc. If the predefined competitor price thresholds are exceeded it will result in the retail site being placed in the manual review queue and dictate that the system administrator at the centralized pricing office determine the requisite price adjustment. Predefined competitor price thresholds may be determined by implementing competitor power ranking comparisons that based on price/demand elasticity statistical analysis.

Additionally, automated pricing determinations may be undertaken for a specific grouping of retail sites, referred to as a price zone grouping, as opposed to individual retail sites. A predefined pricing rule is applied to the price zone grouping and a uniform automatic price change is implemented simultaneously for all of the sites in the zone.

Figure 2:
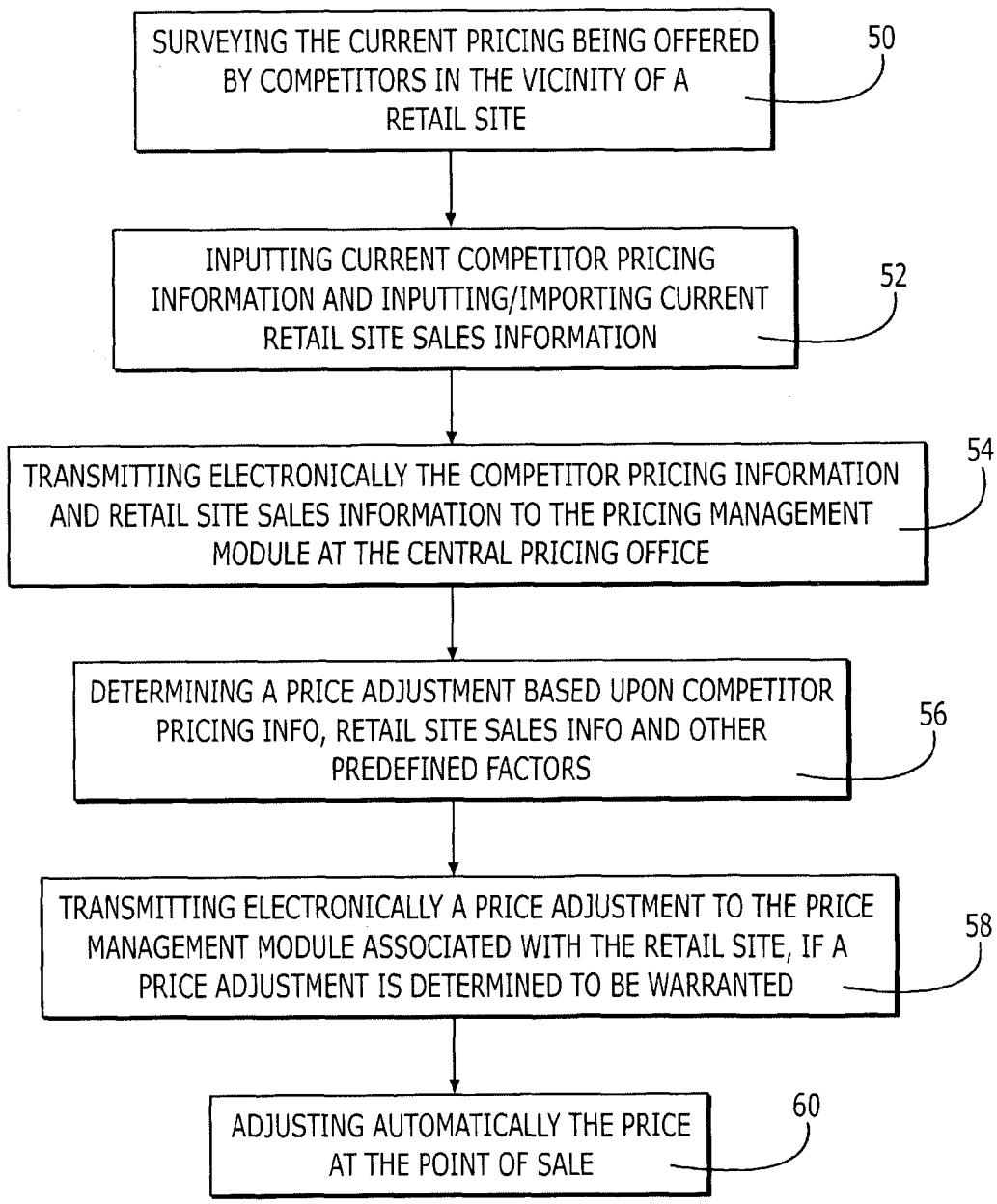
FIG. 2 is a flow diagram of a method for price management in a retail pricing environment, in accordance with one embodiment of the present invention.

FIG. 2 depicts a flow diagram of a method for price adjustment in accordance with an embodiment of the present invention. At step 50, the remote retail sites surveys current competitor pricing. In the fuel pricing embodiment this would entail having a representative of the retail site visit the predefined competitor sites to assess current fuel prices. At step 52, the retail site system administrator inputs current competitor prices and inputs or imports retail site sales data into the first price management module. The competitor pricing information and sales information is then, at step 54, electronically transmitted to the second pricing management module associated with the central pricing office. In one embodiment of the invention the means of electronic communication is satellite communication, however, other means of electronic network communication may also be used without departing from the inventive concepts herein disclosed.

At step 56, using the current competitor pricing information and retail site sales information the second pricing management module determines a price adjustment using other predefined factors, such as, cost of the product, federal, state and local taxes assessed on the product, minimum pricing laws and the like. Alternatively, the central pricing office system administrator may manually adjust prices based upon factors outside of those predefined in the second pricing management module. For example, certain unforeseen conditions may warrant a concurrent increase or decrease in price at all remote retail sites. If the pricing management module or system administrator determines that a price adjustment is warranted then, at step 58, the price adjustment is electronically transmitted to the retail site. The first pricing management module associated with the retail site receives the price adjustment transmission and, at step 60, prices are automatically adjusted at the point of sale. In the fuel pricing embodiment this would entail automatically adjusting the price at the fuel service pump and the automated pricing signs located on the retail site.

Site Information File

Figure 3:
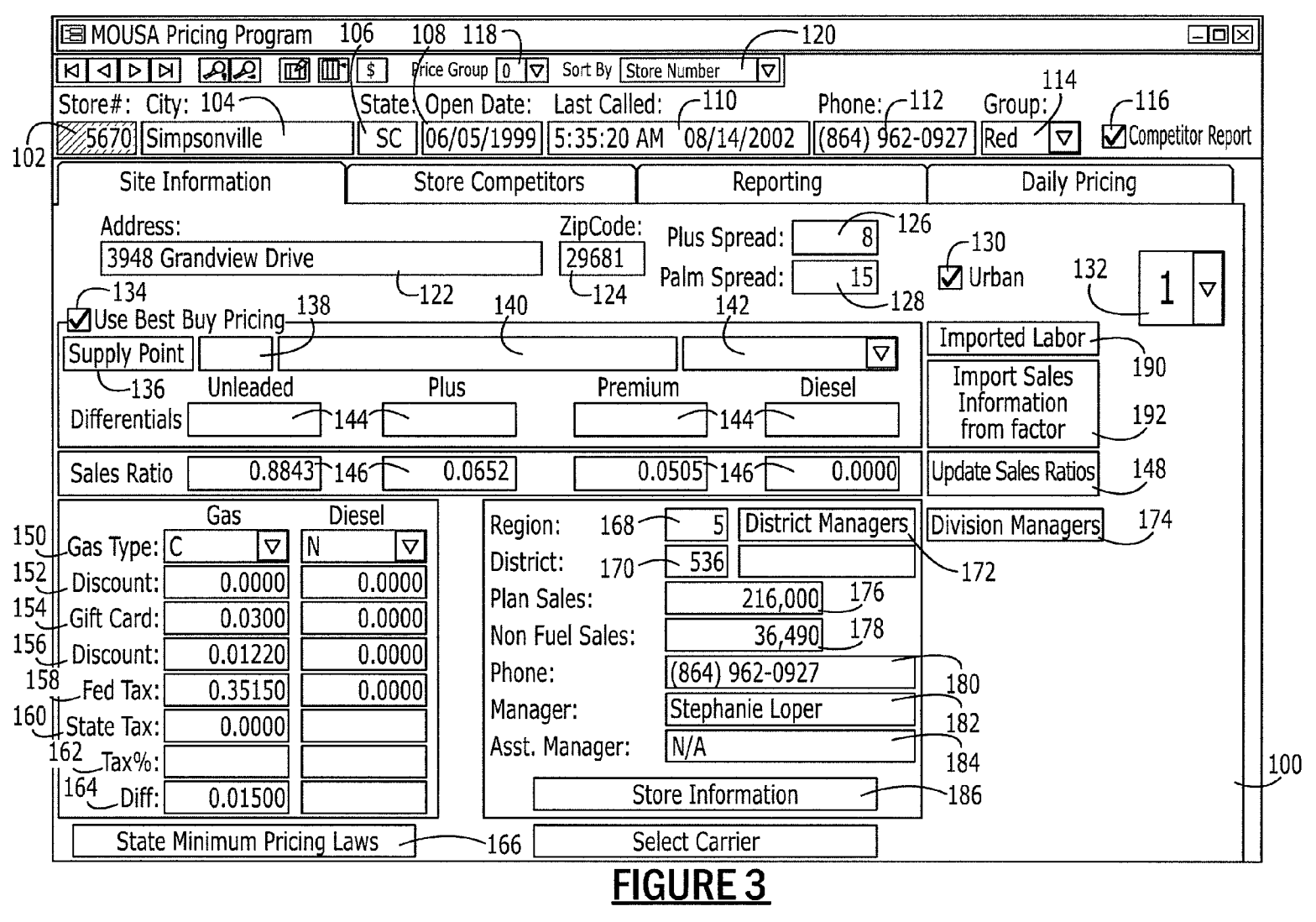

FIG. 3 illustrates a display monitor depiction of a site information file 100 implemented in accordance with the pricing management module of the present invention. The site information file provides the pricing management system with the background information related to each remote retail site. The system administrator associated with the centralized pricing office can input or change the information in the site information file. The input fields and the activation keys shown in FIG. 3 are by way of example only. Other input fields and activation keys may also be implemented as dictated by the application of the pricing system without departing from the inventive concepts herein disclosed.

Located above the site information file 100 on the display monitor are various header fields related to the remote retail site. The header fields are typically created by the centralized pricing office system administrator at the inception of the remote retail site or the fields are updated automatically as information is communicated to the centralized pricing office. The header fields allow the system administrator to search for and find a specific retail site. The header fields above the file folders include the "store number" field 102, the "city" field 104, the "state" field 106, the "open date" field 108, the "last called" field 110, the "phone number" field 112, the "group" field 114 and the "competitor report" field 116. The "store number" field signifies the store number assigned by the home office, typically in order of store opening or systematically by region. The "city" and "state" fields indicate the location of the remote retail site. The "open date" field indicates the date that the site first opened for business and the "last called" field indicates the time and date that the last communication was transmitted to or from the remote retail site. The "phone" field indicates the phone number of the remote retail site. The "group" field indicates a color coded grouping for which this particular site is assigned. This grouping allows for retail sites to be further segregated into groupings based on predetermined conditions and provides data analysts a further tool for distinguishing retail sites. For example, grouping may be categorized according to historical fuel volumes sold at the retail site. The "competitor report" field indicates whether a competitor report exists in the pricing management module for this particular remote retail site. The competitor report located in the store competitors file and discussed infra. includes information related to competitors in the general vicinity of the remote retail site, the pricing guidelines used by these competitors and the current prices charged by these competitors. The "price group" field 118 allows for the sorting of retail sites based on price grouping. For example, price grouping may be conducted based upon the geographic location of the retail sites. The "sort-by" field 120 allows the administrator to sort the remote retail site by information in the header fields, such as site number, competitor price, open date, pool margin, last called, projected sales volume and the like.

The "site information" file 100 comprises various information fields related to a specific remote retail site. The street address and zip code of the remote retail site are indicated in the "address" field 122 and the "zip code" field 124. The "plus spread" field 126 and the "premium spread" field 128 allow the system administrator to set the price difference between regular fuel and plus fuel and regular fuel and premium fuel for this particular retail site. In this regard, when the regular fuel price is adjusted the pricing management module knows how to appropriately adjust the plus and premium prices based on the spreads specified in the site information file. The "urban" field 130 allows the administrator to designate the site as "urban" if it is located within a populous area or if the site is not designated as "urban" it is deemed to be "rural". This designation further distinguishes between remote retail sites and is used by other reporting schemes and analysis tools implemented by the pricing management module.

The "price group" field 132 allows the site administrator to designate a remote retail site amongst various price groups. Price groups are subsets of the overall remote retail sites and are typically identifiable by a characteristic associated with the remote retail site. In one embodiment of the invention the price groups are assigned based upon geographic location of the remote retail sites. By way of example, price group "1" is the east coast region, price group "2" is the southeast region, price group "3" is the southwest region, etc. By designating the remote retail sites via price groupings it is feasible and within the inventive concepts herein disclosed to allow for specific home office system administrators to administer the pricing system for their assigned price group.

The "best buy pricing" field 134 allows the system administrator to designate the remote retail site as a best buy price site. If the site is so designated the retail location will purchase its fuel from the lowest cost source. If the site is not designated as a best buy site, purchasing may be conducted based on the closest, in proximity, supply point (typically dictated by state law). Activation of the "supply point" key 136 provides for a listing of all supply points that meet the designated criteria, i.e., best buy or non-best buy. A supply point can then be chosen from the supply list or a supply point can be manually typed into the supply point fields. The supply point fields include 138, 140 and 142 the supply point number, the city and state of the supply point and specific purchase arrangement with the supply point, accordingly.

The "differentials" fields 144 indicate the plus or minus amount applied to each fuel type based on supply point assigned to the retail site and they assist in calculating the actual cost of the fuel. The "sales ratio" fields 146 indicate the current sales ratio of fuel types. For example, in the illustrated embodiment the retail site is currently selling 88.43% unleaded, 6.52% plus, 5.05% premium and negligible or no diesel sales. The sales ratio information can be updated by engaging the "update sales ratios" key 148 that accesses information either stored in a database associated with the pricing management module or communicates with the remote retail site to determine real-time sales ratios.

The "gas type" field 150 allows the administrator to designate the fuel type for the site as being conventional (C), oxygenated (O) or reformulated (R). In the illustrated embodiment the diesel fields are designated as (N) signifying that no diesel fuel is available at this location. The "discount" field 152 allows the administrator to set a fuel discount for a specific site, if the site has an ongoing, current buyer promotion related to fuel pricing. The "gift card" field 154 is indicative of a loyalty discount being applied to those purchases made by customers who possess the gift card. In the embodiment shown the gift card discount is $0.03 per gallon. The "freight" field 156 allows the administrator to adjust the price of the fuel by adding the cost related to transportation of the fuel from the source to the retail site. The "federal tax" field 158, the "state tax" field 160 and the "tax %" field 162 allows the administrator to adjust the price of the fuel in accordance with the requisite federal and state taxes. The federal tax is typically a fixed amount while the state tax may be a fixed amount or it may be calculated as a percentage of the price of the fuel.

The "differential" field 164 allows the administrator to adjust the minimum margin of the price of the fuel. The minimum margin is defined as the minimum price per gallon that the retail site must charge above cost as dictated by state laws. The "state minimum pricing laws" key 166 provides the administrator access to the minimum pricing laws for the state in which the retail site is located so that the administrator assures that they are abiding by applicable state law.

The "region" and "district" fields 168 and 170 provide for further categorization of the retail site based on geographic location of the site. The "district manager" key 172 and "division manager" key 174 provide access to a complete listing of all district managers and all division managers associated with the retail sites. The "plan sales" field 176 and "non-fuel sales" field 178 are monthly goals for the site established by the system administrator. The "plan sales" field denotes monthly fuel sales goals in terms of gallons. The "non-fuel sales" field denotes monthly non-fuel sales goals in terms of dollars.

The "telephone" field 180, "manager" field 182 and "assistant manager" field 184 provide for site-specific contact information for the retail site. Further retail site information may be accessed by engaging the "store information" key 186, which provides the site administrator with access to a composite profile window of the information related to the retail site.

Additional activation keys disposed in the site information file include the "import labor" key 190 that allows the system administrator at central pricing office to access labor totals for a specific pay period from an associated payroll module. The "import sales information from factor" key 192 allows the system administrator to access sales numbers from a secondary account to validate accuracy between the separate sales reporting functions.

Store Competitors File

Figure 4:
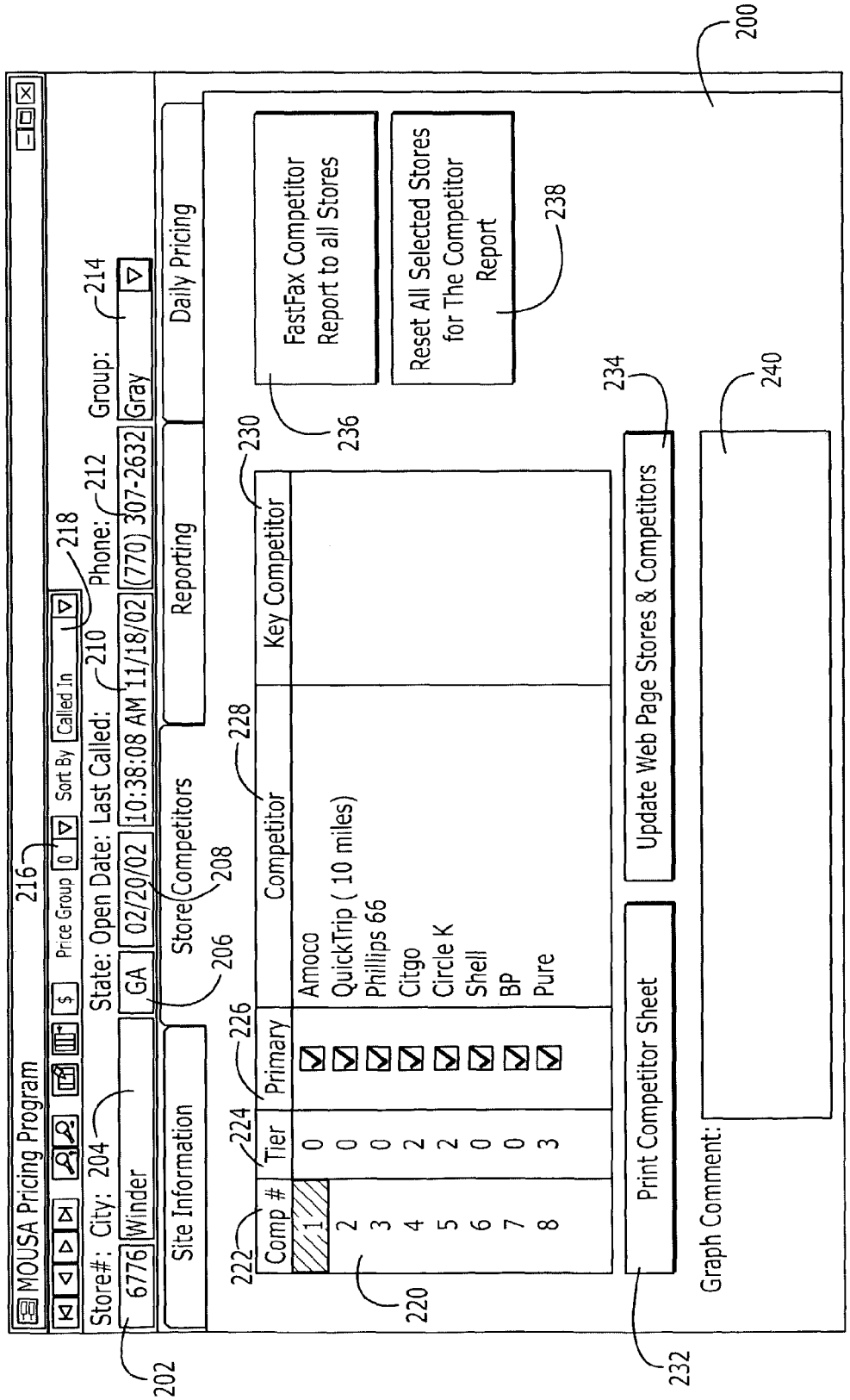
FIG. 4 is a depiction of a display monitor illustrating a store competitor file of a price management module, in accordance with an embodiment of the present invention.

FIG. 4 illustrates a display monitor depiction of a store competitors file 200 implemented in accordance with the pricing management module of the present invention. The store competitor file provides the price management system with information related to each competitor located within a predetermined competition vicinity of a remote retail site. Either the system administrator associated with the centralized pricing office or the administrator at the remote retail site can input or change the information in the store competitor file. The input fields and the activation keys shown in FIG. 4 are by way of example only. Other input fields and activation keys may also be implemented as dictated by the application of the pricing system without departing from the inventive concepts herein disclosed.

Located above the store competition file 200 on the display monitor are various header fields related to the remote retail site. The header fields allow the system administrator to search for and find a specific retail site. The header fields above the file folders include the "store number" field 202, the "city" field 204, the "state" field 206, the "open date" field 208, the "last called" field 210, the "phone number" field 212, and the "group" field 214. The "store number" field signifies the store number assigned by the home office, typically in order of store opening or systematically by region. The "city" and "state" fields indicate the location of the remote retail site. The "open date" field indicates the date that the site first opened for business and the "last called" field indicates the time and date that the last communication was transmitted to or from the remote retail site. The "phone" field indicates the phone number of the remote retail site. The "group" field indicates the assigned group to which the retail site has been assigned. The "price group" field 216 allows for the sorting of retail sites based on price grouping. For example, price grouping may be conducted based upon the geographic location of the retail sites. The "sort-by" field 218 allows the administrator to sort the remote retail site by information in the header fields, such as site number, competitor price, open date, pool margin, last called, projected sales volume and the like.

The store competitor file 200 includes a competitor grid 220 that contains information related to a retail site's competitors. The grid includes "competitor number" column 222 that provides for a list of numbers associated with the competitors who are located within a predetermined vicinity of the remote retail site. In the example shown in FIG. 4, eight competitors exist for retail site number 6766 (located in Windsor, Ga.). The "tier" column 224 provides for the competitors to be assigned a tier based upon major brands and non-major brands. The tier system allows for the competitors to be appropriately weighed for comparison purposes. The "primary" column 226 indicates which competitors are currently being used for price comparison surveying. The "competitor" column 228 lists the retail names of the competitors and other distinguishing features. The "key competitor" column 230 allows the administrator to identify the retail site's key competitor(s) for analysis purposes.

The "print competitor sheet" key 232 allows the system administrator to print out or directly fax a site specific competitor work sheet to use when assessing the current fuel prices being charged by the listed competitors. Remote retail sites will typically assess competitors pricing on a daily basis and report competitor pricing information back to the centralized pricing office through the pricing system of the present invention. The "update web page stores and competitors" key 234 allows the system administrator to change the competitor listing to accurately reflect the remote retail site's competitors. The "fast fax competitor report" key 236 provides for the centralized pricing office to automatically fax a site-specific competitor worksheet to all remote retail sites. The "reset all selected stores for the competitor report" key 238 automatically resets or deselects all of the competitors to non-primary status (i.e., the primary column 226 will have all fields empty, indicating that no competitors are currently be statused for price comparison).

The "graph comment" section 240 provides the system administrator with an entry field where comments related to a specific competitor may be inputted. For example, it may be beneficial to note when a particular competitor opened or other specific information related to a competitor.

Daily Pricing File

FIG. 5 illustrates a display monitor depiction of a daily pricing file 300 implemented in accordance with the pricing management module of the present invention. The daily pricing file provides the system with information related to the daily pricing of the remote retail site and the site's competitors. Retail site prices and competitor prices are imported into the daily pricing file of the price management system via a server interface. Either the system administrator associated with the centralized pricing office or the administrator at the remote retail site can input or change the information in the daily pricing file. The input fields and the activation keys shown in FIG. 5 are by way of example only. Other input fields and activation keys may also be implemented as dictated by the application of the pricing system without departing from the inventive concepts herein disclosed.

Located above the daily pricing file 300 on the display monitor are various header fields related to the remote retail site. The header fields allow the system administrator to search for and find a specific retail site. The header fields above the file folders include the "store number" field 302, the "city" field 304, the "state" field 306, the "open date" field 308, the "last called" field 310, the "phone number" field 312, the "group" field 314 and the competitor report field 316. The "price group" field 318 allows for the sorting of retail sites based on price grouping. For example, price grouping may be conducted based upon the geographic location of the retail sites. The "sort-by" field 320 allows the administrator to sort the remote retail site by information in the header fields, such as site number, competitor price, open date, pool margin, last called, projected sales volume and the like.

The daily pricing file 300 includes a daily price grid 322 that displays dates and prices on those dates and a competition price grid 324 that displays current competitor pricing. Additionally, the daily pricing file includes a "competition follows" field 326 provides the system administrator a pull down menu by which the retail site can be designated according to whether the competition follows fuel pricing changes. Typically pull-down options will include "sometimes", "always" and "never". The "go to price" fields 328 allows the site administrator to type in new retail prices for unleaded fuel, plus fuel, premium fuel and diesel fuel. The "print report" key 330 pulls up the price change window (FIG. 8), which displays the "go to prices" or new prices in addition to the current prices prior to activating the price adjustment at the retail site. The "lowest legal price" field 332 displays the current lowest legal price that the retail site can charge, according to state law, for unleaded fuel.

The daily pricing grid 322 provides a running list of sales data and pricing for the remote retail site. In the embodiment shown in FIG. 5, the last seven consecutive dates are displayed. It is possible to display other dates by utilizing the scrolling function to the right of the grid. The "date" column 334 indicates the last seven consecutive calendar dates. The "gallons" column 336 indicates the number of overall gallons (i.e., unleaded, premium, plus and diesel) sold at the retail site for the specified date. The fields in the gallon column may be color coded to indicate changes in rolling average sales percentages. For example, an entry that is coded red may indicate that the sales for that date are down 10% or more from a four-week average or a entry that is coded blue may indicate that the sales for that date are up 10% or more from a four-week average. The "gift card" column 338 provides daily totals of the number of gallons that were purchased using a gift card, otherwise referred to as a loyalty card or customer appreciation card.

The "UL" column 340, the "plus" column 342, the "prem" column 344, and the "diesel" column 346 indicate the price per gallon charged on the date listed for unleaded, plus, premium and diesel fuel. In the example shown in FIG. 4, a two cent decrease in the price of fuel occurred on Aug. 11, 2002 and the site does not offer diesel fuel. The "pool margin" column 348 indicates the total amount of profit made per gallon for each sales date. Pool margin is a weighted average of the fuel grades sold and is determined based on supplier cost of the fuel and the retail price for which the fuel was sold on a particular date.

The competition price grid 324 indicates current fuel sale prices for the competitors listed in the store competitors file (see FIG. 4). The "competitor number" column 350 indicates the assigned competitor number, in this example; competitor numbers 1-8 have been assigned. The "tier" column 352 indicates the tier assigned to the competitor. The use of the tier system provides for the competitors to be assigned a tier based upon major brands and non-major brands and allows for the competitors to be appropriately weighed for comparison purposes. The "station" column 354 lists the retail names of the competitors. The "unleaded" column 356, "plus" column 358, "premium" column 360 and "diesel" column 362 list the current reported sales prices for unleaded, plus, premium and diesel fuel for each of the specified competitors. The current prices listed in the competitor field may be color coded to indicate increases or decreases in price. For example, a blue colored entry may indicate that the price has undergone an increase from the previous reporting period and a red colored entry may indicate that the price has undergone a decrease from the previous reporting period.

Additional information fields are also displayed in the daily pricing file 300. The "projected fuel sales" field 364 is an estimate of the projected fuel sales in gallons for the month. The "% of plan" field 366 indicates how fuel sales for the retail site are progressing versus the targeted or planned sales for the current month. For example, in the example shown in FIG. 5, the actual fuel sales are 0.93% above the targeted or planned sales for the retail site in August. The "prior year" field 368 indicates the fuel sales in gallons for the month in the preceding year. For example, in FIG. 5, 296,978 gallons of fuel were sold at the retail site during August of the prior year. The "non-fuel sales" field 370 indicates the previous day's non-fuel sales for the retail site.

The fuel sales graph 372 provides lines graphs of the current week and previous week fuel sales. Gallons in thousands are indicated along the x-coordinate and days of the week are indicated along the y-coordinate. It is also possible to access a four-week graph, comprising four line graphs, by engaging the four-week folder 374.

The "note" section 376 allows the system administrator at the central office or at the retail site to input comments related to sales, pricing or competitor pricing.

Reporting File

Figure 6:
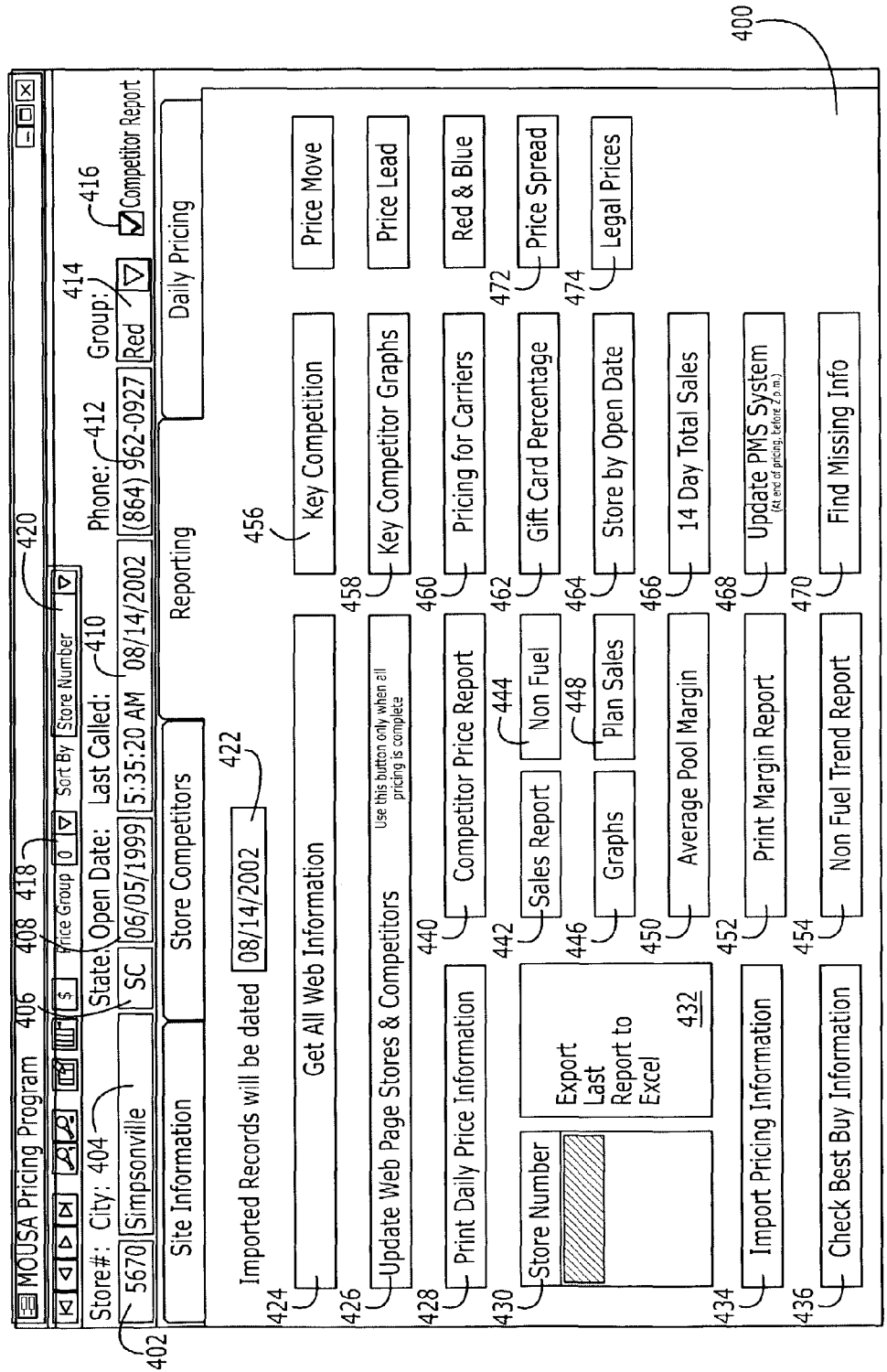
FIG. 6 is a depiction of a display monitor illustrating a reporting file of a price management module, in accordance with an embodiment of the present invention.

FIG. 6 illustrates a display monitor depiction of a reporting file 400 implemented in accordance with the pricing management module of the present invention. The reporting file provides the individual accessing the file, typically the system administrator, with various reporting functions. The activation keys shown in FIG. 6 are by way of example only. Other activation keys may also be implemented as dictated by the application of the pricing system without departing from the inventive concepts herein disclosed.

Located above the reporting file 400 on the display monitor are various header fields related to the remote retail site. The header fields allow the system administrator to search for and find a specific retail site. The header fields above the file folders include the "store number" field 402, the "city" field 404, the "state" field 406, the "open date" field 408, the "last called" field 410, the "phone number" field 412, the "group" field 414 and the competitor report field 416. The "price group" field 418 allows for the sorting of retail sites based on price grouping. For example, price grouping may be conducted based upon the geographic location of the retail sites. The "sort-by" field 420 allows the administrator to sort the remote retail site by information in the header fields, such as site number, competitor price, open date, pool margin, last called, projected sales volume and the like.

The reporting file 400 includes a plurality of access keys that provide reports related to pricing and sales. The "imported records will be dated" field 422 indicates the date that will be displayed on all records/reports that are accessed by the reporting file keys. Typically, the displayed date will be the current date, however, the field allows the system administrator to predate or postdate the report as the application may dictate.

The "get all web information" key 424 accesses and imports all of the recently transmitted competitor price survey information. The "update web page stores and competitors" key 426 transmits to the retail site changes to competitor listings or other related site-specific information. The "print daily price information" key 428 allows the system administrator to print daily price information for each retail site. The "store number" field 430 indicates the store number for which the reports that are being accessed pertain to. The "export last report to excel" key 432 allows the system administrator to export and automatically convert the last report to a spreadsheet program, such as Microsoft™ Excel™ or the like. The "import pricing information" key 434 allows the system administrator to communicate the retail site and learn the current fueling costs that are being charged by the retail site. The "check best buy information" key 436 allows the system administrator to access supply point information for the purpose of comparing supply point information.

The "competitor price report" key 440 allows the system administrator to access the competitor pricing information, such as the information noted in the competition grid 324 of FIG. 5. The "sales report" key 442 provides access to the fuel sales information for the site, such as the information noted in the sales grid 322 of FIG. 5 and the like. In a similar fashion, the "non-fuel" key 444 provides access to the non-fuel sales information for the retail site. The "graphs" key 446 provides access to various graphs, such as overall, regional or individual retail site pricing versus competitor pricing, which can be broken down based on tiers. The "plan sales" key 448 provides access to the information related to the planned or targeted sales for the retail site and graphs actual sales versus targeted sales.

The "average pool margin" key 450 is provided. The "print margin report" key 452 provides access to the current margin for the selected retail site. The "non-fuel trend report" key 454 provides access to daily trends in sales of non-fuel products at the selected retail site.

The "key competition" key 456 provides access to a competitor's pricing information that has been designated a key competitor, such as a low-price leader competitor. The "key competitor graphs" key 458 provides access to graphical comparison data for a key competitor. The "pricing for carriers" key 460 provides information on freight prices charged by carriers to deliver the fuel from the source to the retail site. The "gift card percentage" key 462 provides access to the percentage of sales, either daily, monthly or other period, that were conducted with a customer appreciation or gift card. The "stores by open date" key 464 provides sales and pricing information for all retail sites categorized by the date that the retail site opened for business.

The "14 day total sales" key 466 provides sales data for the previous 14 day sales period. The "Update PMS system" key 468 updates an auxiliary reporting and sales management module with current pricing and sales information. The "find missing info" key 470 queries the database, identifies missing information or incorrect information and locates the missing or acceptable data. The "price spread" key 472 is an analysis tool that allows the administrator to ascertain margins if different price spreads are implemented between unleaded, plus and premium fuel grades. The "legal prices" key 474 provides a listing of any retail sites that may be currently operating in non-compliance with state minimum pricing laws.

Competitor Price Update Web Page

Figure 7:
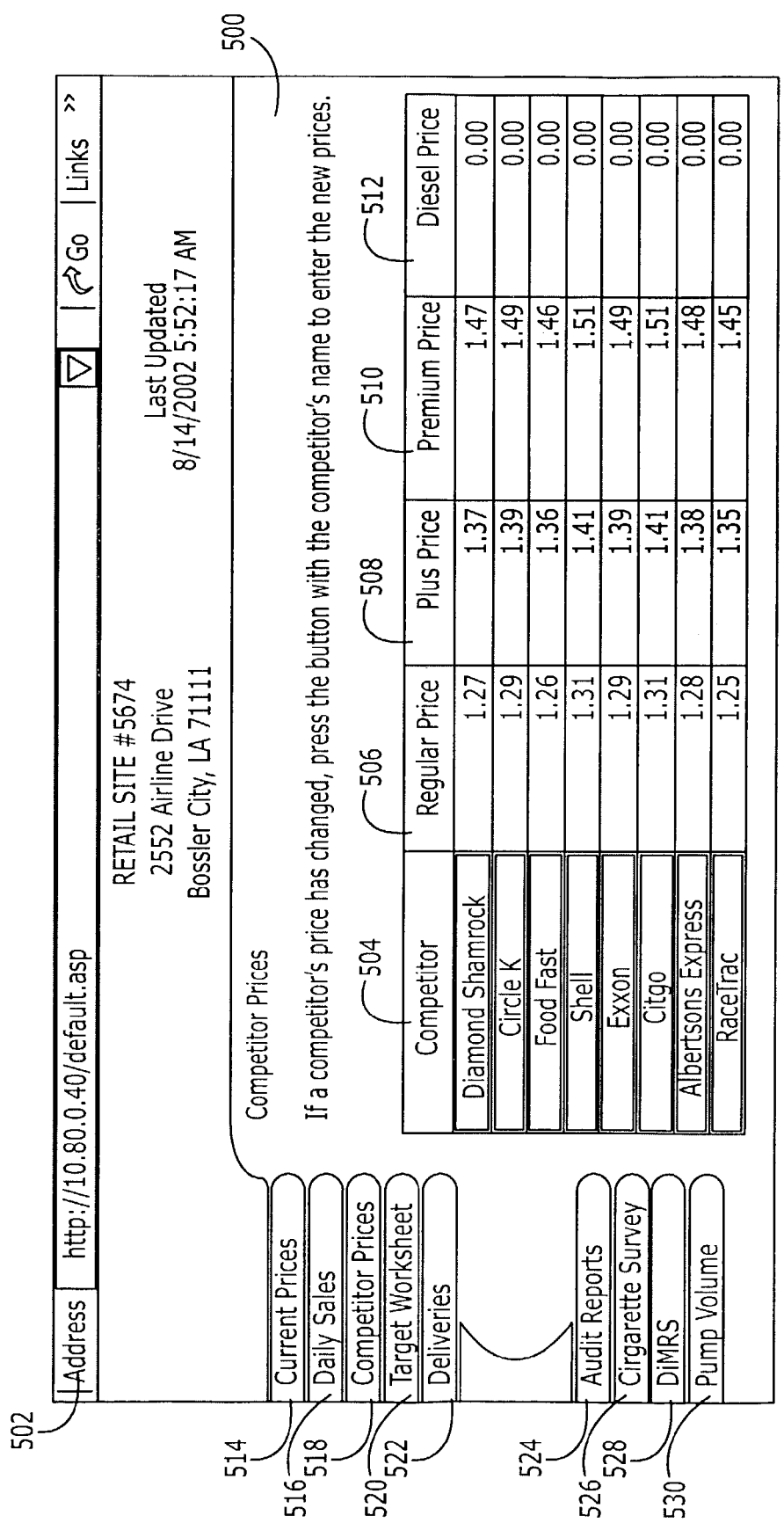
FIG. 7 is a depiction of a display monitor illustrating a competitor prices web page of a price management module, in accordance with an embodiment of the present invention.

FIG. 7 illustrates a display monitor depiction of a competitor price update web page 500 implemented in accordance with the pricing management module of the present invention. The competitor price update web page is typically accessed by the retail site administrator and provides a means for updating the current fuel prices being offered by competitors. The retail site administrator accesses the web page, inputs necessary updates into the pricing fields and the information is communicated electronically via the network to the central office site where the data is stored in SQL databases for subsequent implementation by the price management system of the present invention.

The retail site system administrator accesses the web page by inputting an assigned web address into the address field 502. The web page will typically exist on a company specific intranet, however; other forms of network communication, including the Internet, are also possible and within the inventive concepts herein disclosed.

The competitor price web page includes a "competitor" column 504 that lists all of the retail sites competitors. The listings are in the form of activation keys that upon activation allow the retail site administrator to change fuel prices accordingly. The competitor price grid also includes a "regular price" column 506, a "plus price" column 508, a "premium price" column 510 and a "diesel price" column 512. The competitor pricing information is transmitted to the central pricing office by activating a "transmit pricing info" key.

The keys disposed to the left of the competitor price grid allow the retail site administrator access to site-specific information and reports. The "current price" key 514 provides the retail site with the current prices that the site is charging (or should be charging). The "daily sales" key 516 provides the retail site administrator access to a window for importing or manually inputting the prior day sales totals into the price management module and subsequently transmitting this data to the central pricing office. The "competitor prices" key 518 provides access to the competitor price input window shown in FIG. 7. The "target worksheet" key 520 provides the retail site administrator access to a worksheet that tracks actual retail site performance (fuel sales, non-fuel sales, employee hours, etc.) versus the planned site performance.

The "deliveries" key 522 provides access to information concerning upcoming planned fuel deliveries to the retail site. The "audit reports" key 524 provides access to retail site accounting records. The "cigarette survey" key 526 provides a competitor cigarette pricing survey input form. The "DiMRS" key 528 provides for a district manager tracking system and the "pump volume" key 530 provides the retail site with information concerning the volume of fuel sold by any one fuel pump. The "pump volume" key allows the site administrator to determine fuel pumps that are malfunctioning and require service.

Price Change Input Window

Figure 8:
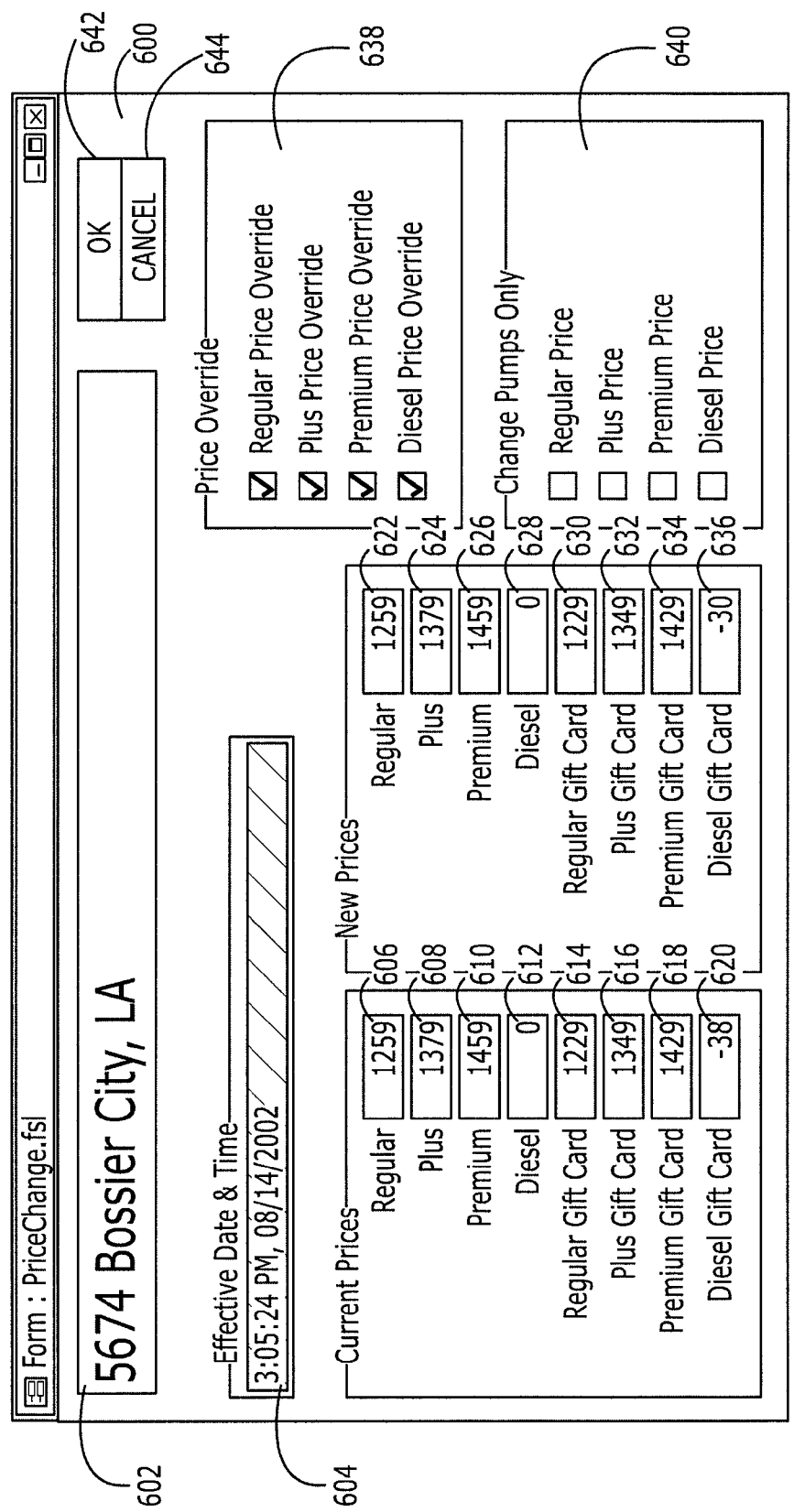
FIG. 8 is a depiction of a price change input window of a price management module, in accordance with an embodiment of the present invention.

FIG. 8 illustrates a display monitor depiction of a price change input window 600 implemented in accordance with the pricing management module of the present invention. The price change input module is typically accessed by the central office system administrator to change prices manually. This window is accessed from the daily pricing file (FIG. 5) by activating the "print report" key 330. In certain embodiments of the invention pricing updates will be done automatically based upon predefined price change conditions defined in the price change management system module of the present invention.

The price change input module 600 provides for a "retail site address" field 602 that provides for the retail site number and city/state of location. The "effective date and time" field 604 provides for the new prices to be implemented immediately or allows for the changes to be implemented at a future date and time. The module provides for the current prices, shown as "regular" field 606, "plus" field 608, "premium" field 610 and "diesel" field 612. These fields denote the current prices per gallon for regular unleaded, plus, premium and diesel fuels. The "regular gift card" field 614, "plus gift card" field 616, "premium gift card" field 618 and "diesel gift card" field 620 indicate the current prices per gallon for regular unleaded, plus, premium and diesel fuels for customers using the requisite gift card.

In addition, the module provides for new prices, shown as "regular" field 622, "plus" field 624, "premium" field 626 and "diesel" field 628. These fields denote the new prices per gallon for regular unleaded, plus, premium and diesel fuels. The "regular gift card" field 630, "plus gift card" field 632, "premium gift card" field 634 and "diesel gift card" field 636 indicate the new prices per gallon for regular unleaded, plus, premium and diesel fuels for customers using the requisite gift card.

The price override fields 638 provide for an indication that the new prices are to be executed at the retail site. If the price override fields remain unchecked than the new prices will not be implemented unless the current prices shown in the price change window of FIG. 8 match the actual prices currently being charged at the retail site. The change pumps only fields 640 provide for the price on the service fuel pumps to be changed but not the price on the site's signs if the field is checked. If the field(s) are not checked the price will be changed on the service fuel pumps and on the site sign(s). The "ok" key 642 executes the price change and the "cancel" key 644 cancels the implementation of the new prices and returns the pricing to the current prices.

Fast Fax Competition Survey Form

Figure 9:
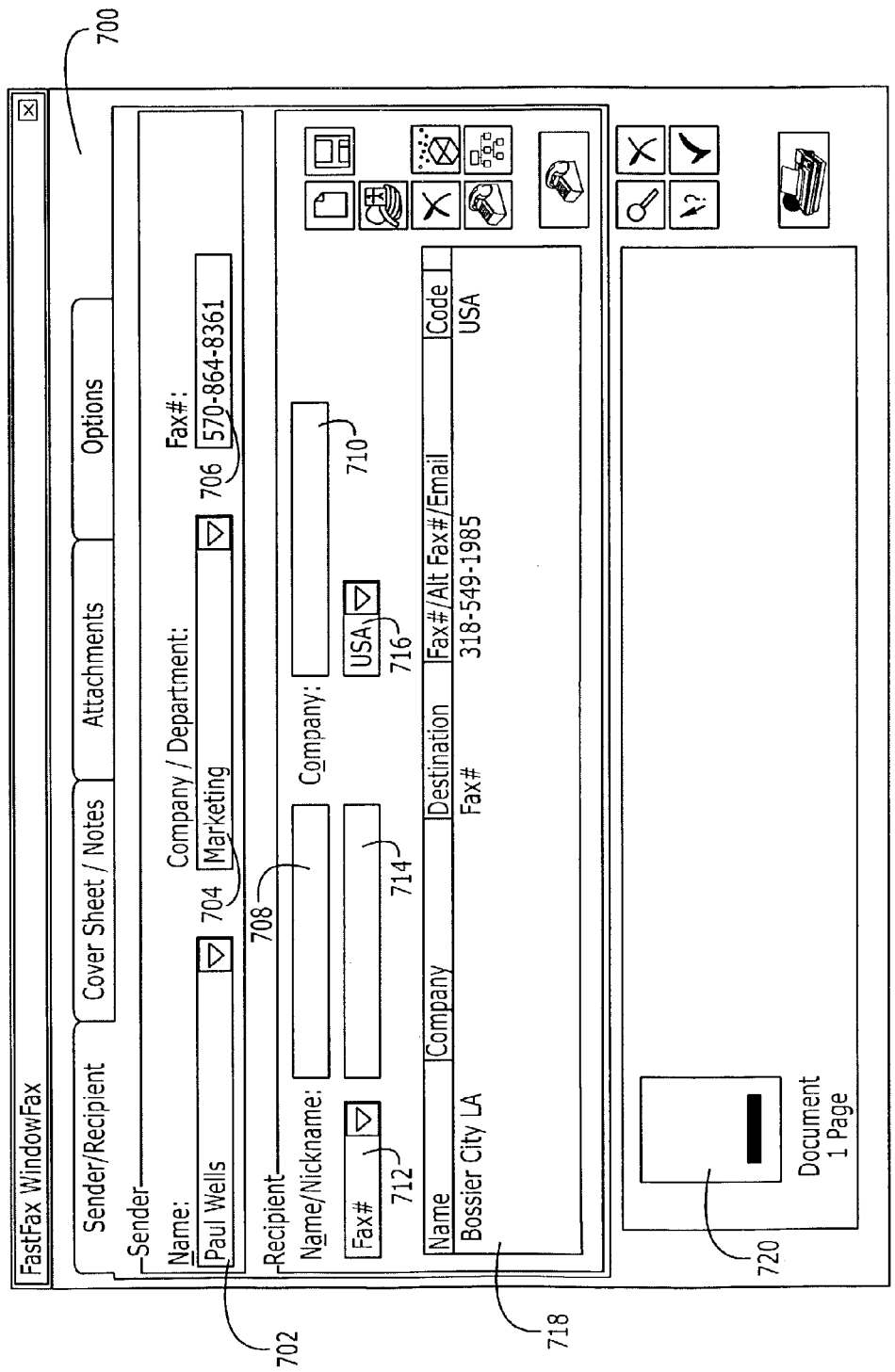
FIG. 9 is a depiction a fastfax window of a price management module, in accordance with an embodiment of the present invention.
Figure 11:
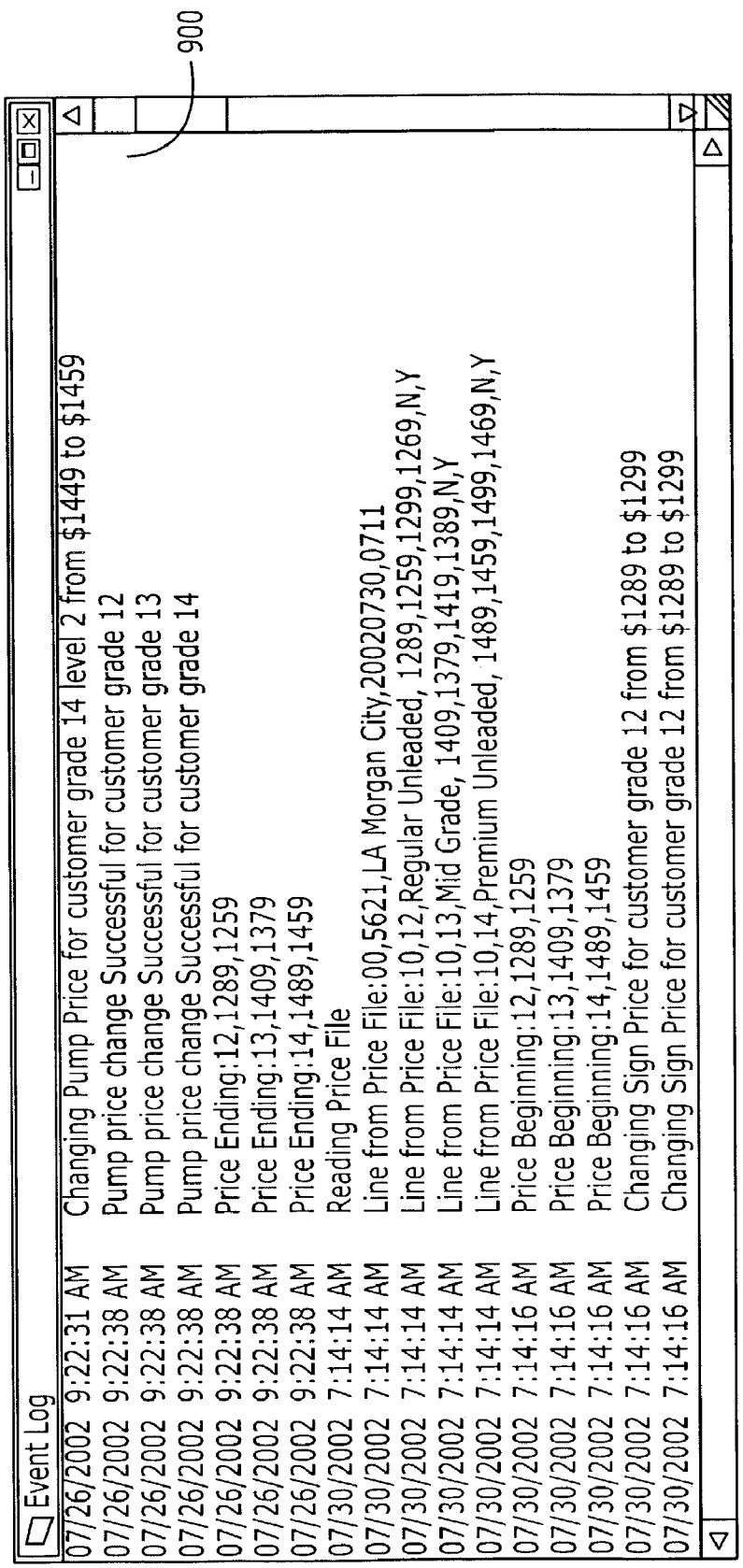
FIG. 11 is a depiction of an event log window of a price management module, in accordance with an embodiment of the present invention.

FIG. 9 illustrates a display monitor depiction of a fast fax competition survey form module 700 implemented in accordance with the pricing management module of the present invention. The fast fax option allows the central office system administrator to fax a site-specific competition survey form to one or more remote retail sites. This window is accessed from the store competitor file by engaging either the print competitor sheet key 232 or the "fastfax competitor reports to all stores" key 236. Typically, the central office system administrator will be able to fax all of the sites a specific competition survey form concurrently via electronic fax submittal.

The fast fax competition survey form module provides for sender fields including "name" field 702, "company/department" field 704, and "fax number" field 706. The recipient fields include "name" field 708, "company" field 710, "fax number" field 712, "address" field 714 and "country" field 716. The recipient information is listed in the recipient list 718 which provides for a list of all recipients that will receive the sent fax. The competition survey form 720 is a separate document that is faxed to all of the listed recipients. Upon receipt of the competition survey form the retail sites use the form to survey the competitors within their competition vicinity to assess the competitors current fuel prices.

Retail Site Database Window

FIG. 10 illustrates a display monitor depiction of the overall retail site database window 800 implemented in accordance with the pricing management module of the present invention. The overall retail site database is typically accessed by the central office system administrator. This is a background module that is used by the price management module to import data related to retail sites. The overall retail site databases is sortable by all of the field headings that are located across the top toolbar. These fields include "store number" field 802, "city" field 804, "state" field 806 and "district field" 808. The header fields also include the "date opened" field 810, the "current regular fuel price" field 812, the "current plus fuel price" field 814, the "current premium fuel price" field 816 and the "current gift card discount" field 818. The listing also provides for a heading for "current connection status" 820, which indicates if the retail site is currently connected to the price management system or whether an error condition prevents a current connection from being established. The "version" field 822 indicates the current version of the pricing management system that the retail site is currently implementing. The "store time" field 824 indicates the current local time for each retail site. The "price date" field 826 and "price time" field 828 indicate the last date and time that price changes were implemented at the retail site.

Additionally, from the display of the retail site database the system administrator may change the fuel prices, accordingly. By checking the "go to price" field 830 the administrator is able to adjust the actual price of regular, plus or premium fuel or the gift card discount price. By checking the "price change" field 832 the administrator is able to adjust the increment by which the price for regular, plus or premium fuel will be adjusted.

The "effective date and time" field 834 allows the system administrator to change the prices immediately or to define an effective date and time for implementation of the change in the future. The "send price change" key 836 allows the system administrator to confirm and send the price changes to the remote retail site for immediate pricing update or future pricing update. The "today's pricing changes" key 838 provides for access to information related to the sites that have undergone price changes as of the current date.

Event Transaction Log

FIG. 10 illustrates a display monitor depiction of the event transaction log 900 implemented in accordance with the pricing management module of the present invention. The event transaction log keeps a running list, by date and time, of the transactions/events that have occurred within the pricing management system. For example, price changes that have been successfully implemented are logged, the importation of pricing data from a retail site is logged and other events that occur between the retail sites and the central office are also logged.

As described above, the price management system of the present invention is able to automatically or manually determine price adjustments based on current competitor pricing, retail site sales and other price related factors, such as cost of the product, freight charges, state and federal laws and state and federal taxes. Once price adjustments are determined they are able to instantaneously and automatically implemented at the point of sale. In one of the most relevant applications, retail automotive fuel pricing, the system is able to automatically adjust and display prices on the fuel pumps as well as the advertising signs in the vicinity of the retail site.

This system and methods provide for a comprehensive and efficient means of determining price adjustments and implementing the price adjustments in real-time fashion at the point-of-sale.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended Claims. Although specific terms are employed herein, they are used in a generic and descriptive sense only and not for purposes of limitation.

That which is claimed:

1. A system for price management, the system comprising:
   a plurality of first network communication devices, each device associated with at least one of a plurality of retail sales sites, including a first network communication device of a first retail sales site at a physical location;
   a first price management module configured to operate on the first network communication device of the first retail sales site and configured to electronically transmit sales data of the first retail sales site and competitor price data of another retail sales site at a different physical location than the first retail sales site, wherein both the sales data and the competitor price data:
      are for at least one retail sales commodity,
      are transmitted from the first retail sales site to a central pricing site, and
      are each site-specific to the physical location of the first retail sales site;
   a second network communication device associated with the central pricing site; and
   a second price management module configured to operate on the second network communication device, the second price management module further configured to electronically receive the data transmitted by the plurality of first network communication devices, determine if a site-specific price adjustment is required for a retail sales site based upon the data received from the plurality of first network communication devices, and, when the site-specific price adjustment is required for a retail sales site, electronically transmit the site-specific price adjustment to the first network communication device associated with the retail sales site of the site-specific price adjustment when a site-specific price adjustment is determined to be required,
      wherein the first network communication devices associated with the retail sales sites are configured to receive site-specific price adjustments from the second price management module of the second network communication device associated with the central pricing site,
      wherein the first price management modules of the first network communication devices associated with the retail sales sites are configured to automatically adjust a price for at least one of the retail sale commodities at the retail sales site of the first network communication device,
      wherein the first retail sales site is the retail sales site of the site-specific price adjustment, wherein the first network communication device associated with the first retail sales site of the site-specific price adjustment is configured to receive the site-specific price adjustment, and
      wherein the first price management module of the first network communication device associated with the first retail sales site of the site-specific price adjustment is configured to automatically adjust the price for at least one of the retail sale commodities at the first retail sales site.

2. The price management system of claim 1, wherein at least one retail sales site comprises a retail fuel service site with at least one fuel pump, wherein the first price management module of the at least one retail sales site is further configured to electronically transmit retail site fuel sales data and competitor fuel price data to the central pricing site, wherein the second price management module is further configured to determine if a fuel price adjustment is required, and wherein the first price management module is further configured to adjust the fuel price at the at least one fuel pump.

3. The price management system of claim 2, wherein the first price management module is further configured to adjust the fuel price at one or more fuel price advertisement signs located within the vicinity of a retail sales site that comprises a retail fuel service site.

4. The price management system of claim 1, wherein the second price management module determines if a site-specific price adjustment is required based upon a current competitor price and a current retail site price for at least one retail sales commodity.

5. The price management system of claim 4, wherein the second price management module determines if a site-specific price adjustment is required based additionally upon at least one of: a supply acquisition cost of one or more products for sale, applicable state sales taxes, applicable federal sales taxes, freight costs from supplier to retail site, and applicable state minimum pricing laws.

6. The price management system of claim 4, wherein the second price management module determines if a site-specific price adjustment is required based additionally upon at least a supply acquisition cost of one or more products for sale.

7. The price management system of claim 1, wherein the second price management module is further configured to permit a system administrator to manually input price adjustments for one or more retail sites and electronically transmit the price adjustments to the associated retail sites.

8. The system of claim 1, wherein the site-specific price adjustment required for the first retail sales site is based at least in part upon the site-specific competitor price data for the first retail sales site.

9. The system of claim 1, wherein at least one first network communication device is associated with two retail sales sites, wherein the first price management module of the first network communication device associated with two retail sales sites is configured to electronically transmit site-specific retail site sales data and competitor price data for each of the two retail sales sites of which the first network communication device is associated.

10. A system for retail fuel price management, the system comprising:
    a plurality of first network communication devices, each device associated with at least one of a plurality of retail fuel sales sites, including a first network communication device of a first retail sales site at a physical location;
    a first price management module configured to operate on the first network communication device of the first retail fuel sales site and configured to electronically transmit fuel sales data of the first retail fuel sales site and competitor fuel price data of another retail fuel sales site at a different physical location than the first retail fuel sales site, wherein both the sales data and the competitor fuel price data:
    are transmitted from the first retail fuel sales site to a central pricing site, and
    are each site-specific to the physical location of the first retail fuel sales site;
a second network communication device associated with a central pricing site; and
a second price management module configured to operate on the second network communication device, the second price management module further configured to electronically receive the data transmitted by the plurality of first network communication devices, determine if a site-specific fuel price adjustment is required for a retail fuel sales site based upon the data received from the plurality first network communication devices, and, when the site-specific fuel price adjustment is required at a retail fuel sales site, electronically transmit the site-specific fuel price adjustment to the first network communication device associated with the retail fuel sales site of the site-specific fuel price adjustment when a site-specific fuel price adjustment is determined to be required,
    wherein the first network communication devices associated with the retail fuel sales sites are configured to receive site-specific fuel price adjustments from the second price management module of the second network communication device associated with the central pricing site,
    wherein the first price management modules of the first network communication devices associated with the retail fuel sales sites are configured to automatically adjust a fuel price at the retail fuel sales site of the first network communication device,
    wherein the first retail fuel sales site is the retail fuel sales site of the site-specific price fuel price adjustment, wherein the first network communication device associated with the first retail fuel sales site of the site-specific fuel price adjustment is configured to receive the site-specific fuel price adjustment, and
    wherein the first price management module of the first network communication device associated with the first retail fuel sales site of the site-specific fuel price adjustment is configured to automatically adjust the fuel price at fuel pumps of the first retail fuel sales site associated with the site-specific fuel price adjustment.

11. The retail fuel price management system of claim 10, wherein at least one first price management module is further configured to adjust the fuel price at fuel price advertisement signs located within the vicinity of the retail fuel site associated with the at least one first price management module.

12. The retail fuel price management system of claim 10, wherein the second price management module determines if a site-specific fuel price adjustment is required based upon a current competitor fuel price and a current retail site fuel price.

13. The retail fuel price management system of claim 12, wherein the second price management module determines if a site-specific fuel price adjustment is required based additionally upon at least one of: fuel supply acquisition cost, applicable state fuel sales taxes, applicable federal fuel sales taxes, freight costs from supplier to retail fuel site, and applicable state minimum fuel pricing laws.

14. The retail fuel price management system of claim 12, wherein the second price management module determines if a site-specific fuel price adjustment is required based additionally upon at least fuel supply acquisition cost.

15. The retail fuel price management system of claim 10, wherein the second price management module is further configured to permit a system administrator to manually input fuel price adjustments for one or more retail fuel sites and electronically transmit the price adjustments to the associated retail fuel sites.

16. The system of claim 10, wherein the second price management module implements predefined pricing rules.

17. The system of claim 16, wherein the predefined pricing rules include automatically matching changes in at least one competitor fuel price.

18. The system of claim 10, wherein the second price management module is further configured to perform a statistical price analysis and to display the results of the statistical price analysis.

19. The system of claim 18, wherein the statistical price analysis includes competitor ranking comparisons.

20. The system of claim 18, wherein the statistical price analysis includes an analysis of at least one predefined pricing rule.

21. The system of claim 18, wherein the statistical price analysis includes data related to prices for a plurality of retail sale commodities including at least one fuel grade.

22. The system of claim 10, wherein the central pricing site stores past competitor fuel price data.

23. The system of claim 10, wherein the second price management module is further configured to generate at least one report related to pricing and sales of at least one retail site.

24. A system for retail fuel price management, the system comprising:
    a plurality of first network communication devices, each device associated with a respective one of a plurality of retail fuel sales sites having fuel pumps, including a first network communication device of a first retail fuel sales site at a physical location;
    a first price management module configured to operate on the first network communication device of the first retail fuel sales site and configured to electronically transmit fuel sales data of the first retail fuel sales site and competitor fuel price data of another retail fuel sales site at a different physical location than the first retail fuel sales site, wherein both the sales data and the competitor fuel price data:
        are transmitted from the first retail fuel sales site to a central pricing site, and
        are each site-specific to the physical location of the first retail fuel sales site;
    a second network communication device associated with the central pricing site; and
    a second price management module configured to operate on the second network communication device, the second price management module further configured to electronically receive the retail fuel sales data and the competitor fuel price data transmitted by the plurality of first network communication devices, determine if a fuel price adjustment is required for any of the retail fuel sites based upon the received retail fuel sales data and the received competitor fuel price data, and, when a fuel price adjustment is determined to be required for any of the retail fuel sites, electronically transmit the required fuel price adjustment to the first network communication device of the respective retail fuel sales site, wherein the first retail fuel sales site is one of the first network communication devices to which the second price management module transmits the required fuel price adjustment, wherein the first network communication device associated with the first retail fuel sales site is configured to receive the required fuel price adjustment from the second price management module of the second network communication device associated with the central pricing site, and wherein the first price management module of the at least one first network communication device is configured to automatically impose the required fuel price adjustment by adjusting the fuel price at the fuel pumps of the first retail fuel sales site.

25. The system of claim 24, wherein the required fuel price adjustment is associated with one or more specific retail fuel sales sites.

26. The system of claim 24, wherein the required fuel price adjustment is associated with a price zone group comprising more than one retail fuel sales site and less than all of the retail fuel sales sites.

* * * * *

UNITED STATES PATENT AND TRADEMARK OFFICE
CERTIFICATE OF CORRECTION

PATENT NO. : 8,306,851 B2
APPLICATION NO. : 10/375647
DATED : November 6, 2012
INVENTOR(S) : Wells et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1676 days.

Signed and Sealed this
Eleventh Day of November, 2014

Michelle K. Lee
*Deputy Director of the United States Patent and Trademark Office*